United States Patent
Tamura (10) Patent No.: US 9,925,871 B2
(45) Date of Patent: Mar. 27, 2018

(54) CONTROL DEVICE FOR VEHICLE FOUR-WHEEL DRIVE DEVICE

(71) Applicant: TOYOTA JIDOSHA KABUSHIKI KAISHA, Toyota-shi, Aichi-ken (JP)

(72) Inventor: Hiroshi Tamura, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/093,276

(22) Filed: Apr. 7, 2016

(65) Prior Publication Data
US 2016/0297300 A1    Oct. 13, 2016

(30) Foreign Application Priority Data

Apr. 10, 2015 (JP) .................................. 2015-081280
Nov. 24, 2015 (JP) .................................. 2015-229203

(51) Int. Cl.
B60K 23/08    (2006.01)
B60K 17/35    (2006.01)

(52) U.S. Cl.
CPC ...... *B60K 23/0808* (2013.01); *B60K 17/3515* (2013.01); *B60K 2023/0858* (2013.01)

(58) Field of Classification Search
CPC ................................................ B60K 23/0808
See application file for complete search history.

(56) References Cited

U.S. PATENT DOCUMENTS

| 5,168,955 | A | * | 12/1992 | Naito ................. B60K 23/0808 180/197 |
| 5,813,939 | A | * | 9/1998 | Masumoto ............ B60K 23/04 477/107 |
| 8,428,838 | B2 | * | 4/2013 | Kondo ................... B60K 23/08 701/69 |
| 2014/0172258 | A1 | | 6/2014 | Mita et al. |
| 2014/0297150 | A1 | * | 10/2014 | Ohyagi .............. B60K 17/3505 701/89 |

FOREIGN PATENT DOCUMENTS

| JP | I-107-017277 A | 1/1995 |
| JP | 2010-260383 A | 11/2010 |
| JP | 2014-118043 A | 6/2014 |

* cited by examiner

*Primary Examiner* — Tisha D Lewis
(74) *Attorney, Agent, or Firm* — Oliff PLC (57) ABSTRACT

A control device for a vehicle four-wheel drive device includes a drive source, front wheels, rear wheels, a rear-wheel differential gear, a friction clutch, and an electronic control unit. The electronic control unit is configured to correct a calculated clutch torque to decrease in a case where a four-wheel drive running is performed and it is determined that the turning direction is a direction in which the vehicle turns such that an outer wheel is a rear wheel on a side where the friction clutch is provided. The electronic control unit is configured to correct the calculated clutch torque to increase in a case where the four-wheel drive running is performed and it is determined that the turning direction is a direction in which the vehicle turns such that an inner wheel is the rear wheel on the side where the friction clutch is provided.

4 Claims, 7 Drawing Sheets

| | TL | TR | Rr TORQUE |
|---|---|---|---|
| CLOCKWISE TURNING | Tc | Tc·TBR | (TBR+1)Tc |
| COUNTERCLOCKWISE TURNING | Tc | Tc/TBR | (TBR+1)Tc/TBR |

FIG. 3B

| | TL | TR | Rr TORQUE |
|---|---|---|---|
| CLOCKWISE TURNING | 2·Tc/(TBR+1) | 2·TBR·Tc/(TBR+1) | 2Tc |
| COUNTERCLOCKWISE TURNING | 2·TBR·Tc/(TBR+1) | 2·Tc/(TBR+1) | 2Tc |

CONTROL DEVICE FOR VEHICLE FOUR-WHEEL DRIVE DEVICE

INCORPORATION BY REFERENCE

The disclosure of Japanese Patent Application No. 2015-081280 and 2015-229203 filed on Apr. 10, 2015 and Nov. 24, 2015 including the specification, drawings and abstract is incorporated herein by reference in its entirety.

BACKGROUND OF THE INVENTION

1. Field of the Invention

The present invention relates to a control device for a vehicle four-wheel drive device, and particularly to a control of a four-wheel drive device in which a friction clutch is provided between a rear-wheel differential gear and either of right and left rear wheels.

2. Description of Related Art

There has been known a four-wheel drive device based on an FF vehicle in which a torque of a drive source is transmitted to front wheels at the time of two-wheel drive running and the torque of the drive source is transmitted to the front wheels and rear wheels at the time of four-wheel drive running. Such a four-wheel drive device is provided with a friction clutch for adjusting a torque split to be transmitted to the front and rear wheels. In a four-wheel drive device described in Japanese Patent Application Publication No. 2010-260383 (JP 2010-260383 A), a multi-plate clutch mechanism 30 is provided between a rear-wheel differential gear 26 and a right rear wheel 82. When a torque of the multi-plate clutch mechanism 30 is adjusted, a torque split between front wheels and rear wheels is adjusted.

SUMMARY OF THE INVENTION

In the meantime, like JP 2010-260383 A, in a case where a multi-plate clutch is provided between the rear-wheel differential gear and the right rear wheel, a bias torque occurs when a vehicle turns during four-wheel drive running. Accordingly, even if the multi-plate clutch generates the same torque, a total value of a rear-wheel torque changes according to a turning direction (that is, a torque split between the front and rear wheels changes). As such, even if the multi-plate clutch generates the same torque, the torque split between the front and rear wheels changes according to the turning direction, which causes such a problem that turning-round performance during turning changes. Note that JP 2010-260383 A does not mention the problem at all.

The present invention provides a control device that can obtain the same turning-round performance regardless of a turning direction in a vehicle four-wheel drive device in which a friction clutch that can adjust a torque is provided between a rear-wheel differential gear and a left rear wheel or between the rear-wheel differential gear and a right rear wheel.

A control device for a vehicle four-wheel drive device according to one aspect of the present invention includes a drive source, front wheels, rear wheels, a rear-wheel differential gear, a friction clutch, and an electronic control unit. The front wheels are configured to receive a torque output from the drive source at the time of two-wheel drive running and at the time of four-wheel drive running. The rear wheels are configured to receive the torque output from the drive source at the time of the four-wheel drive running. The friction clutch is configured to adjust a torque split between the front and rear wheels at the time of the four-wheel drive running. The rear-wheel differential gear is configured to appropriately give a differential rotation to the rear wheels on right and left sides during turning. The rear-wheel differential gear includes a left side gear and a right side gear. The friction clutch is placed between either one of the left side gear and the right side gear and the rear wheel placed on the same side in a right-left direction. The other one of the left side gear and the right side gear is connected, without the friction clutch, to the rear wheel placed on the same side as the other one of the left side gear and the right side gear in the right-left direction. The electronic control unit is configured to detect a running state of the vehicle. The electronic control unit is configured to calculate a magnitude of a clutch torque of the friction clutch according to the detected running state. The electronic control unit is configured to control the magnitude of the clutch torque of the friction clutch based on the calculated magnitude of the clutch torque so as to adjust the torque split between the front and rear wheels. The electronic control unit is configured to determine a turning direction of the vehicle. The electronic control unit is configured to correct the calculated clutch torque to decrease in a case where the four-wheel drive running is performed and it is determined that the turning direction is a direction in which the vehicle turns such that an outer wheel is a rear wheel on a side where the friction clutch is provided between the rear-wheel differential gear and the rear wheel. The electronic control unit is configured to correct the calculated clutch torque to increase in a case where the four-wheel drive running is performed and it is determined that the turning direction is a direction in which the vehicle turns such that an inner wheel is the rear wheel on the side where the friction clutch is provided between the rear-wheel differential gear and the rear wheel.

According to the control device for the vehicle four-wheel drive device according to the above aspect, at the time of the four-wheel drive running, the turning direction of the vehicle is determined so as to determine an influence of a bias torque caused during turning of the vehicle with respect to the rear wheels on the right and left sides and to correct the magnitude of the clutch torque of the friction clutch only by the influence of the bias torque based on the turning direction, thereby making it possible to prevent turning-round performance from changing according to the turning direction. For example, in a case where the vehicle turns such that the outer wheel is the wheel on the side where the friction clutch is provided, a torque split toward a rear-wheel side increases with respect to an aimed torque split between the front and rear wheels. In this regard, when the clutch torque of the friction clutch is corrected to decrease, the torque transmitted to the rear-wheel side decreases, so that the aimed torque split can be obtained. Further, in a case where the vehicle turns such that the inner wheel is the wheel on the side where the friction clutch is provided, the torque split toward the rear-wheel side decreases with respect to the aimed torque split between the front and rear wheels. In this regard, when the clutch torque of the friction clutch is corrected to increase, the torque transmitted to the rear-wheel side increases, so that the aimed torque split can be obtained.

In the control device for the vehicle four-wheel drive device according to the above aspect, in a case where it is determined that the vehicle turns, the electronic control unit may be configured to increase the calculated clutch torque as compared with a case where it is not determined that the vehicle turns. According to the above aspect, by increasing the clutch torque of the friction clutch, a torque split of the rear wheels is increased during the turning, thereby making it possible to increase turning-round performance of the vehicle.

In the control device for the vehicle four-wheel drive device according to the above aspect, the electronic control unit may be configured to detect a yaw rate of the vehicle. The electronic control unit may be configured to set a target yaw rate from the detected running state of the vehicle. The electronic control unit may be configured to calculate a correction amount to correct the magnitude of the clutch torque of the friction clutch according to a deviation between the target yaw rate and the detected yaw rate.

The electronic control unit may be configured to change the correction amount with respect to the deviation according to the turning direction. According to the above aspect, at the time when a feedback control by use of the deviation between the yaw rates is performed, the correction amount for the deviation is changed according to the turning direction. Accordingly, a controlled amount by the feedback control attains an aimed value, thereby making it possible to prevent followability to the target yaw rate from changing according to the turning direction.

In the control device for the vehicle four-wheel drive device according to the above aspect, the vehicle four-wheel drive device may include a transfer and a propeller shaft. The transfer may be configured to distribute a torque of the drive source between the front wheels and the rear wheels. The propeller shaft may be configured to connect the transfer to the rear-wheel differential gear in a power transmittable manner. The transfer may include a connection/disconnection mechanism configured to connect/disconnect a power transmission path between the drive source and the propeller shaft. The connection/disconnection mechanism may be configured to connect the power transmission path between the drive source and the propeller shaft during the four-wheel drive running. According to the above aspect, when the friction clutch and the connection/disconnection mechanism are released during the two-wheel drive running, dragging is prevented in a rotational member that constitutes the power transmission path, including the propeller shaft, between the friction clutch and the connection/disconnection mechanism. This makes it possible to further improve fuel efficiency.

In the control device for the vehicle four-wheel drive device according to the above aspect, the electronic control unit may be configured to detect a steering direction or respective rotation speeds of the rear wheels on the right and left sides. The electronic control unit may be configured to determine the turning direction of the vehicle based on the steering direction or a difference between the rotation speeds of the rear wheels on the right and left sides. According to the above aspect, the turning direction can be determined based on the steering direction or the difference between the rotational speeds of the rear wheels on the right and left sides.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the present invention will hereinafter be described in detail with reference to the drawings. Note that the drawings are simplified or modified appropriately in the following embodiment, and a scale ratio, a shape, and the like of each part are not necessarily drawn precisely.

Figure 1:
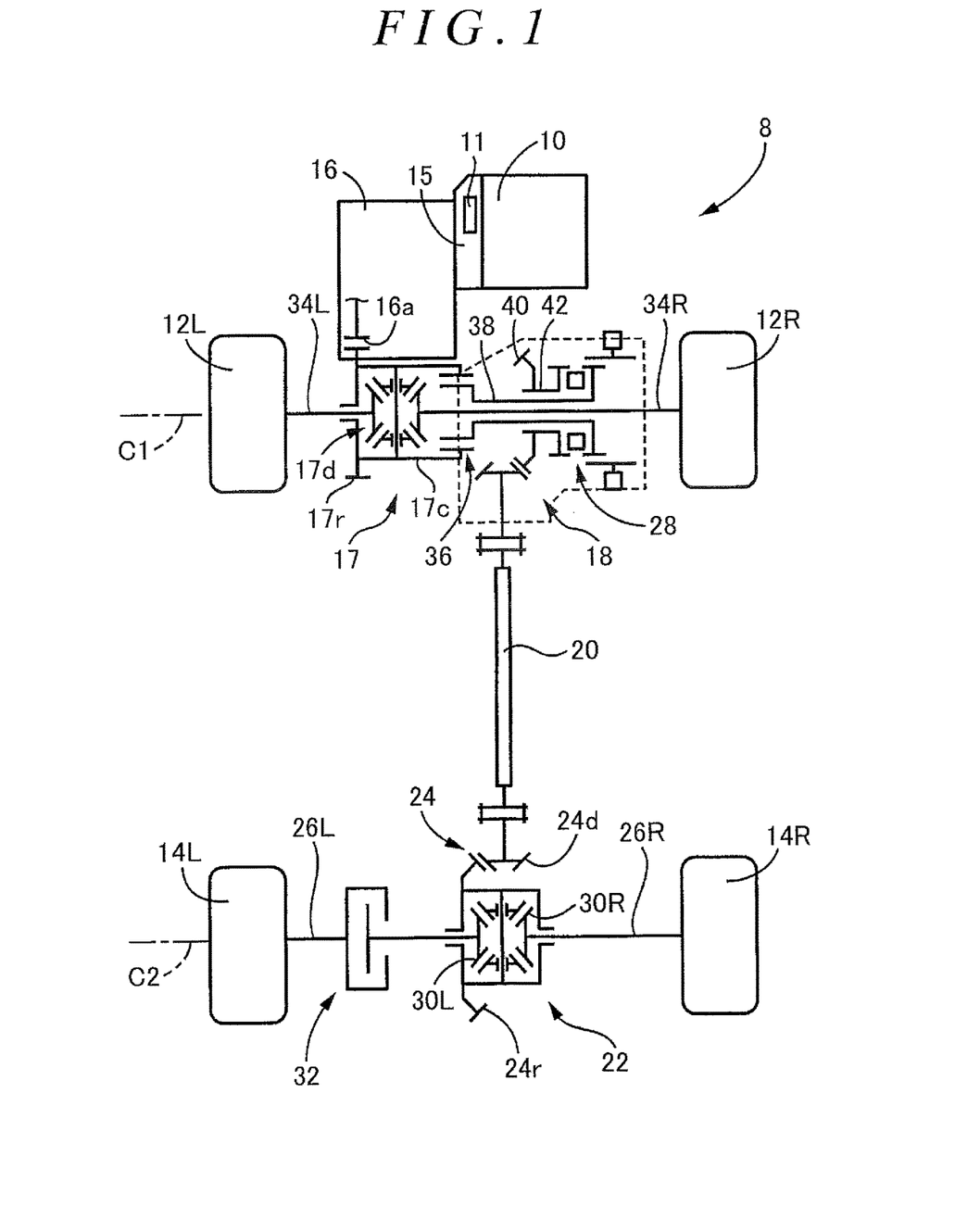
FIG. 1 is an outline view to schematically describe a configuration of a vehicle four-wheel drive device according to one embodiment of the present invention.

FIG. 1 is an outline view to schematically describe a configuration of a vehicle four-wheel drive device 8 (hereinafter referred to as the four-wheel drive device 8) according to one embodiment of the present invention. In FIG. 1, the four-wheel drive device 8 is an FF vehicle-based four-wheel drive device including: a first power transmission path that uses an engine 10 as a drive source and transmits a driving force of the engine 10 to front wheels 12L, 12R (just referred to as the front wheels 12 when they are not distinguished in particular); and a second power transmission path that selectively transmits the driving force of the engine 10 to rear wheels 14L, 14R (just referred to as the rear wheels 14 when they are not distinguished in particular). The front wheels 12 are main driving wheels to which a torque output from the engine 10 is transmitted in either case of two-wheel drive running and four-wheel drive running. The rear wheels 14 are sub-drive wheels that serve as coupled driving wheels at the time of the two-wheel drive running and to which the torque output from the engine 10 is transmitted at the time of the four-wheel drive running. Note that the engine 10 corresponds to a drive source of the present invention.

The four-wheel drive device 8 is constituted by the engine 10, a torque converter 15 including a lock-up clutch 11, an automatic transmission 16 (a transmission), a front differential 17, a transfer 18 including the after-mentioned connection/disconnection mechanism 28 therein, a propeller shaft 20, a bevel gear mechanism 24 that changes a direction of rotation of the propeller shaft 20 and also functions as a speed reducer that slows down the rotation, a rear differential (a rear-wheel differential gear) 22 that appropriately gives a differential rotation to the right and left rear wheels 14 during turning, a coupling 32 provided between a left side gear 30L that constitutes the rear differential 22 and the left rear wheel 14L placed on the same side (the left side) thereof, and so on. Note that a right side gear 30R and the right rear wheel 14 placed on the same side (the right side) thereof are connected to each other via no clutch or the like (without the clutch). Note that the rear differential 22 corresponds to a rear-wheel differential gear of the present invention, and the coupling 32 corresponds to a friction clutch of the present invention.

The automatic transmission 16 is provided on a power transmission path between the engine 10 and the front differential 17, and is constituted by a stepped transmission including a plurality of planetary gears and a plurality of frictional engagement devices (a clutch, a brake), for example. Note that the automatic transmission 16 is a well-known technique, so descriptions of its specific structure and operation are omitted.

The front differential 17 (a front-wheel differential gear) is placed on the same rotation axial center C1 as the front wheels 12. The front differential 17 includes a case 17c and a differential mechanism 17d constituted by a well-known bevel gear. The front differential 17 appropriately gives a differential rotation to left and right front wheel axles 34L, 34R (just referred to as the front wheel axles 34 when they are not distinguished in particular) connected to the front wheels 12 and transmits a driving force thereto. A ring gear 17r functioning as an input rotational member is formed in a case 17c of the front differential 17, and meshes with an output gear 16a, which is an output rotational member of the automatic transmission 16. Accordingly, a torque output from the automatic transmission 16 is input into the ring gear 17r. Note that the front differential 17 is a well-known technique, so descriptions of its specific structure and operation are omitted.

On the same rotation axial center C1 as the front differential 17, the transfer 18 for distributing a torque of the engine 10 between the front wheels 12 and the rear wheels 14. Note that the torque of the engine 10 is transmitted to the transfer 18 via the torque converter 15 and the automatic transmission 16. The transfer 18 is constituted by an input-side rotational member 38 connected to the case 17c of the front differential 17 via a spline portion 36 in relatively non-rotatable manner, an output-side rotational member 42 in which a ring gear 40 for transmitting power to a rear-wheel-14 side is formed, and the connection/disconnection mechanism 28 for connecting/disconnecting the input-side rotational member 38 to/from the output-side rotational member 42. The input-side rotational member 38, the output-side rotational member 42, and the connection/disconnection mechanism 28 are placed around the rotation axial center C1 of the front wheels 12 and the front wheel axles 34.

The connection/disconnection mechanism 28 is constituted by a well-known dog clutch (a meshing clutch). When the connection/disconnection mechanism 28 is connected, the torque of the engine 10 can be transmitted to the rear-wheel side via the output-side rotational member 42 and the propeller shaft 20. Meanwhile, when the connection/disconnection mechanism 28 is released, the transfer 18 is disconnected from the propeller shaft 20, so that the torque of the engine 10 is not transmitted to the rear wheels 14. As such, the connection/disconnection mechanism 28 connects/disconnects a power transmission path between the engine 10 and the propeller shaft 20. Note that the connection/disconnection mechanism 28 includes a synchronization mechanism (a synchro mechanism) (not shown) for synchronizing the input-side rotational member 38 with the output-side rotational member 42 at the time of the connection.

The propeller shaft 20 is provided between the bevel gear mechanism 24 and the output-side rotational member 42 (the ring gear 40) functioning as an output shaft of the transfer 18, and connects the transfer 18 to the bevel gear mechanism 24 and the rear differential 22 in a power transmittable manner. The bevel gear mechanism 24 is constituted by a drive pinion 24d connected to the propeller shaft 20, and a differential ring gear 24r that meshes with the drive pinion 24d. The bevel gear mechanism 24 transmits a rotation to rear wheel axles 26L, 26R that are perpendicular to the propeller shaft 20, and also functions as a speed reducer that slows down a rotation of the propeller shaft 20 and transmits it to a rear-wheel-axle-26 side. The rear differential 22 is placed on a rotation axial center C2. The rear differential 22 appropriately gives a differential rotation to the left and right rear wheel axles 26L, 26R (just referred to as the rear wheel axles 26 when they are not distinguished in particular) during turning, and transmits a driving force thereto. The rear differential 22 is a differential gear constituted by a well-known bevel gear including the right and left side gears 30L, 30R. Note that the rear differential 22 is a well-known technique, so descriptions of its specific structure and operation are omitted.

The coupling 32 provided (on the left rear wheel axle 26L) between the left rear wheel 14L and the left side gear 30L that constitutes the rear differential 22 is constituted by a multi-plate wet clutch (a friction clutch), for example, and is configured to adjust a magnitude of a clutch torque of the coupling 32. For example, when the coupling 32 is released in a state where the connection/disconnection mechanism 28 is connected, the rear differential 22 is in a drag state. That is, no torque is transmitted to the rear-wheel side. Further, when the coupling 32 is completely engaged in a state where the connection/disconnection mechanism 28 is connected, a torque split between the front and rear wheels is 50:50. Further, by controlling the magnitude of the clutch torque of the coupling 32, the torque split between the front and rear wheels during four-wheel drive running can be adjusted between 100:0 and 50:50.

The four-wheel chive device 8 configured as described above is switched appropriately between the two-wheel drive running and the four-wheel drive running according to a vehicle running state. For example, when it is determined that the vehicle performs steady running, the four-wheel drive device 8 is switched to the two-wheel drive running. Here, when the coupling 32 is released, no torque is transmitted to the rear wheels 14. However, when the connection/disconnection mechanism 28 is further released, no dragging occurs in a rotational member (the propeller shaft 20 and the like) that constitutes the power transmission path between the connection/disconnection mechanism 28 and the coupling 32, which further improves fuel efficiency. Further, when switching to the four-wheel drive running is predicted based on a predetermined condition, the connection/disconnection mechanism 28 is connected so as to switch to standby two-wheel drive running that can shift to the four-wheel drive running immediately. Further, when a predetermined condition to switch to the four-wheel drive running is established, the connection/disconnection mechanism 28 is connected and the magnitude of the clutch torque of the coupling 32 is controlled, so as to switch to the four-wheel drive running.

Figure 2:
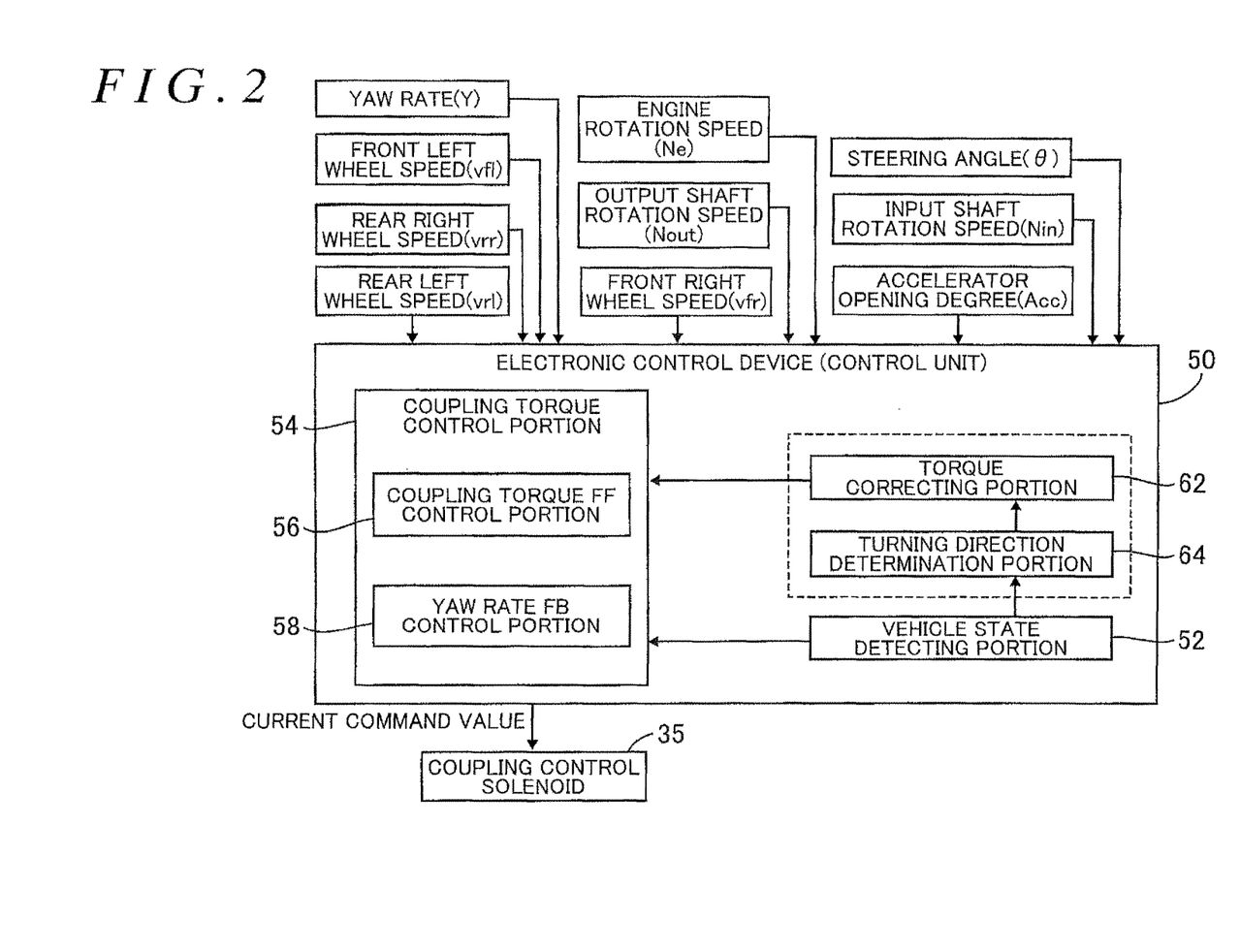
FIG. 2 is a functional block diagram about a clutch torque calculation of a coupling in FIG. 1.

The magnitude of the clutch torque of the coupling 32 is changed appropriately according to a vehicle running state. FIG. 2 is a functional block diagram about a clutch torque calculation of the coupling 32.

The magnitude (a command value) of the clutch torque of the coupling 32 is calculated by an electronic control device 50 (a control unit) as required. The following signals are supplied to the electronic control device 50: a signal indicative of a front left wheel speed vfl detected by a front left wheel speed sensor; a signal indicative of a rear right wheel speed vrr detected by a rear right wheel speed sensor; a signal indicative of a rear left wheel speed vrl detected by a rear left wheel speed sensor; a signal indicative of a front right wheel speed vfr detected by a front right wheel speed sensor; a signal indicative of an engine rotation speed Ne detected by an engine rotation speed sensor; a signal indicative of an input shaft rotation speed Nin of the automatic transmission 16, detected by an input shaft rotation speed sensor; a signal indicative of an output shaft rotation speed Nout detected by an output shaft rotation speed sensor and corresponding to a vehicle speed V; a signal indicative of a steering angle θ detected by a steering sensor; a signal indicative of an accelerator opening degree Acc detected by an accelerator opening sensor; a signal indicative of a yaw rate Y detected by a yaw rate sensor; and the like signals.

The electronic control device 50 is constituted by a vehicle state detecting portion 52, and a coupling torque control portion 54. The coupling torque control portion 54 functionally includes a coupling torque FF control portion 56 and a yaw rate FB control portion 58. Note that the coupling torque control portion 54 corresponds to a torque control portion of the present invention, the coupling torque FF control portion 56 corresponds to a feedforward control portion of the present invention, and the yaw rate FB control portion 58 corresponds to a yaw rate feedback control portion of the present invention.

The vehicle state detecting portion 52 detects various specifications indicating a vehicle running state based on the signals from various sensors described above. The vehicle state detecting portion 52 detects the wheel speeds (vfr, vrr, vfl, vrl), the input shaft rotation speed Nin, the output-shaft rotation speed Nout, the steering angle θ, the accelerator opening degree Acc, the yaw rate Y, and the like signals. Further, the vehicle state detecting portion 52 calculates an engine torque Te based on the engine rotation speed Ne and the accelerator opening degree Acc thus detected, for example, and also calculates a gear ratio γ (a gear stage) of the automatic transmission 16 based on the input shaft rotation speed Nin and the output-shaft rotation speed Nout.

The coupling torque FF control portion 56 calculates a magnitude (a command value) of a clutch torque of the coupling 32 according to the vehicle state based on various specifications detected by the vehicle state detecting portion 52. The coupling torque control portion 54 outputs a current command value to cause a control solenoid 35 to generate the clutch torque. The control solenoid 35 controls the magnitude of the clutch torque of the coupling 32. That is, the coupling torque FF control portion 56 determines an optimum front/rear torque split between the front and rear wheels based on a relational map or the like that is stored by being found in advance from parameters such as the engine torque Te, the vehicle speed V, the gear ratio γ of the automatic transmission 16, and the like, and calculates a magnitude of a clutch torque that realizes the torque split (a command value). Then, the coupling torque control portion 54 outputs a current command value according to the magnitude of the clutch torque to the control solenoid 35 of the coupling 32, so as to adjust the torque split.

Further, when the steering angle θ during turning becomes a predetermined value α or more, which is set in advance, the coupling torque FF control portion 56 calculates a torque command value Pff (a pre-clutch torque) set based on the steering angle θ in addition to the engine torque Te, the vehicle speed V, and the gear ratio γ of the automatic transmission 16. Then, the coupling torque control portion 54 outputs a current command value to the coupling 32 (the control solenoid 35) so that the coupling 32 outputs the torque command value Pff thus calculated by the coupling torque FF control portion 56. In a case where the steering angle θ becomes the predetermined value α or more (that is, when it is determined that the vehicle turns), the coupling torque FF control portion 56 calculates a torque command value Pff that increases the clutch torque as compared with a case where the steering angle θ becomes less than the predetermined value α (that is, when it is not determined that the vehicle turns). More specifically, when the steering angle θ becomes the predetermined value α or more, the relational map is switched to a relational map to determine a torque split between the front and rear wheels by using, as parameters, the steering angle θ in addition to the engine torque Te, the vehicle speed V, and the gear ratio γ of the automatic transmission 16. A torque split between the front and rear wheels is determined based on the relational map, and then, a torque command value Pff that realizes the torque split is calculated. Since the steering angle θ is taken into consideration, the relational map is set so that the torque split of the rear wheels becomes large as compared with the relational map used in a case where the steering angle θ is less than the predetermined value α. This is performed to increase the torque split of the rear wheels so as to increase turning-round performance of the vehicle. The clutch torque of the coupling 32 is increased by the torque command value Pff. Further, when it is determined that the steering angle θ becomes less than the predetermined value α, the coupling torque FF control portion 56 switches to the relational map applied in a case where the steering angle θ is less than the predetermined value α, and calculates a torque command value Pff based on the relational map.

When it is determined that the steering angle θ is a predetermined value β or more, the yaw rate FB control portion 58 calculates a feedback correction amount based on a deviation ΔY(=Y*−Y) between an actual yaw rate Y detected by the yaw rate sensor and a target yaw rate Y*. Note that the target yaw rate Y* is found by referring to an actual operation angle θ and a vehicle speed V based on a relational map found in advance. The relational map is constituted by the steering angle θ and the vehicle speed V, for example. In the meantime, when it is determined that the steering angle θ becomes less than the predetermined value β, the yaw rate FB control portion 58 finishes this feedback control.

The yaw rate FB control portion 58 calculates a torque correction value Pfb from a well-known formula constituted by a well-known proportional term, derivative term, and integration term assuming, as a deviation, a difference ΔY(=Y*−Y) between the actual yaw rate Y and the target yaw rate Y*. The torque correction value Pfb is a correction amount of the clutch torque of the coupling 32 to cause the actual yaw rate Y to follow the target yaw rate Y*. The coupling torque control portion 54 adds (Pff+Pfb) the torque correction value Pfb calculated by the yaw rate FB control portion 58 to the torque command value Pff calculated by the coupling torque FF control portion 56, so that the torque command value is corrected. The coupling torque control portion 54 outputs a current command value to the coupling 32 (the control solenoid 35) so that the coupling 32 outputs the torque command value (Pff+Pfb) thus corrected.

In the meantime, in a case where the coupling 32 is provided on the propeller shaft 20, the torque command value is calculated as described above. In this respect, in the four-wheel drive device 8 of the present embodiment, the coupling 32 is provided between the left rear wheel 14L and the left side gear 30L that constitutes the rear differential 22. In a case where the coupling 32 is provided at such a position, when the vehicle turns, a rear wheel torque on the rear wheel side changes according to a turning direction under the influence of a bias torque (a friction torque at the time when a differential gear differentiates) of the rear differential 22.

Figure 3A:
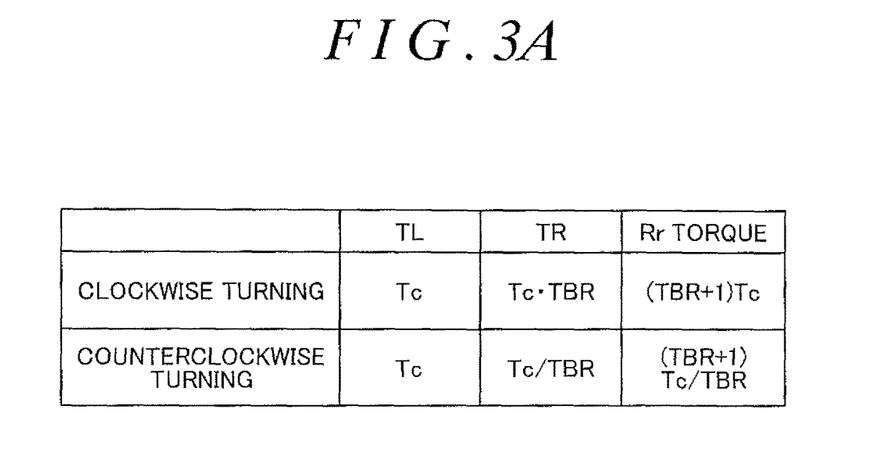
FIG. 3A is a table illustrating a left rear wheel torque, a right rear wheel torque, and a total torque of the left rear wheel torque and the right rear wheel torque during turning of a vehicle, and illustrates a torque of the four-wheel drive device according to one embodiment of the present invention.
Figure 3B:
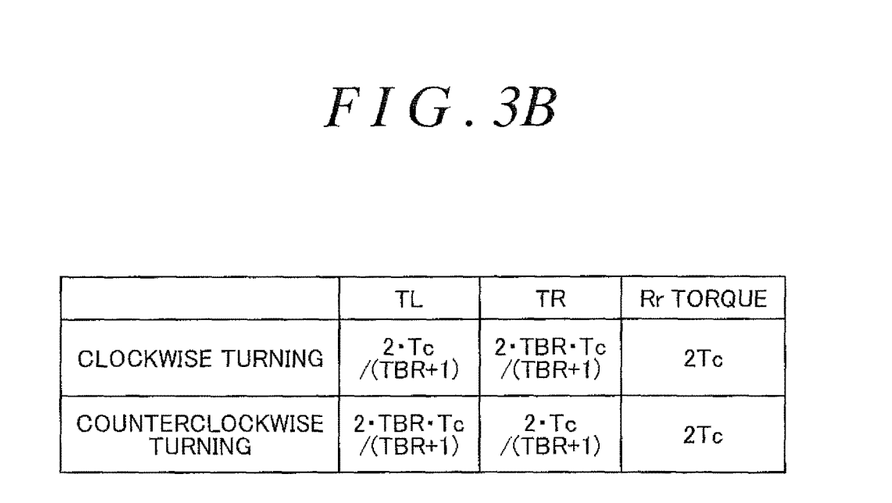
FIG. 3B is a table illustrating a left rear wheel torque, a right rear wheel torque, and a total torque of the left rear wheel torque and the right rear wheel torque during turning of a vehicle, and illustrates a torque in a case where a coupling is provided on a propeller shaft as a comparison.

Tables of FIGS. 3A and 3B illustrate a left rear wheel torque TL, a right rear wheel torque TR, and a total rear wheel torque (Rr torque) of a left torque TL and a right torque TR during turning. FIG. 3A illustrates a torque of the four-wheel drive device 8 of the present embodiment, and FIG. 3B illustrates a torque in a case where a coupling is provided on a propeller shaft, as a comparison. Further, in the tables of FIGS. 3A and 3B, Tc indicates a torque command value of the coupling 32, and TBR indicates a bias ratio of the rear differential 22. The bias ratio is defined by T(slow)/T(fast). Here, T(slow) is a torque of a side gear on a side with a low rotation speed of the differential gear, and T(fast) is a torque of a side gear on a side with a high rotation speed. Note that, in FIGS. 3A and 3B, the differential ratio of the rear differential 22 is calculated to be 1.0 to facilitate understanding. As illustrated in FIG. 3A, in the four-wheel drive device 8 of the present embodiment, clockwise turning and counterclockwise turning have different total rear wheel torques (Rr torques) for the rear wheels 14. In the meantime, in a case where the coupling 32 is provided on the propeller shaft, clockwise turning and counterclockwise turning have a fixed total rear wheel torque (Rr torque) for the rear wheels 14 as illustrated in FIG. 3B.

Figure 4:
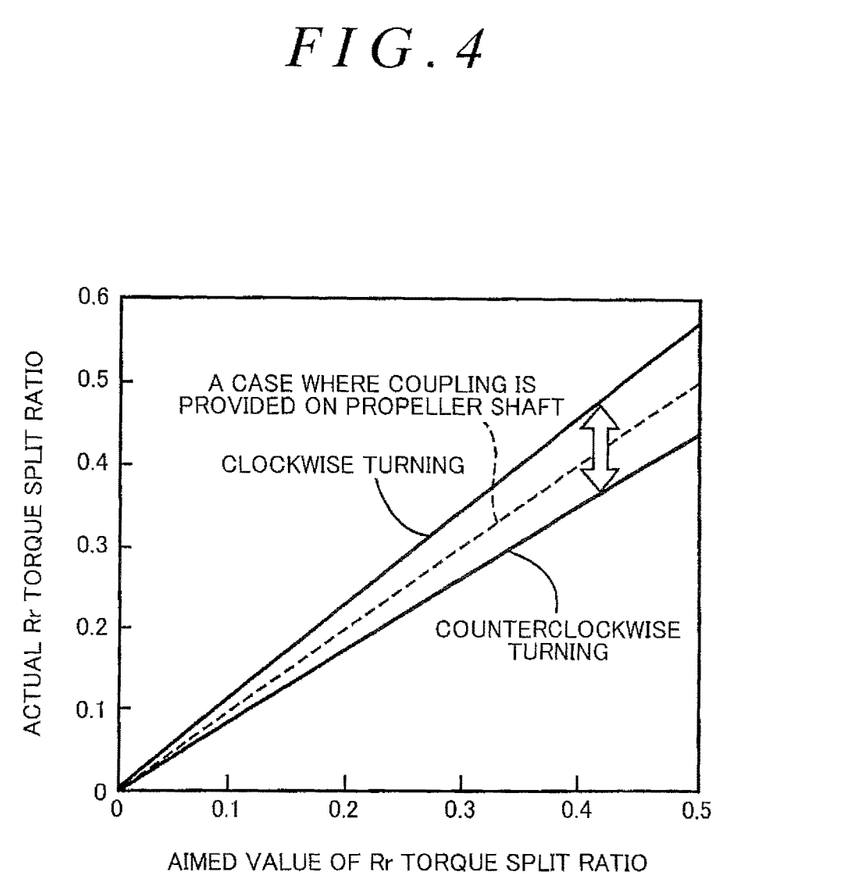
FIG. 4 is a view illustrating a relationship between an aimed Rr torque split ratio and an actual Rr torque split ratio.

FIG. 4 is a view illustrating a relationship between an aimed Rr torque split ratio and an actual Rr torque split ratio. Note that the bias ratio TBR is calculated to be 1.3. In FIG. 4, a horizontal axis indicates an aimed value of the torque split ratio of the total rear wheel torque (Rr torque), and a vertical axis indicates an actual torque split ratio of the total rear wheel torque (Rr torque). In FIG. 4, two bold continuous lines indicate relationships of respective torque splits for counterclockwise turning and clockwise turning in the four-wheel drive device 8. Further, a broken line indicates a relationship of a torque split in a case where the coupling is provided on the propeller shaft.

As indicated by the broken line, in a case where the coupling is provided on the propeller shaft, the aimed value of the torque split ratio and the actual torque split ratio have the same value, and the turning direction does not have any influence. In the meantime, in the four-wheel drive device 8, since a direction of the bias torque is different between the counterclockwise turning and the clockwise turning, so the torque split ratio changes according to the turning direction. For example, at the time of the clockwise turning, the actual torque split ratio is higher than the aimed value of the torque split ratio by around 15%. Further, at the time of the counterclockwise turning, the actual torque split ratio is decreased to about 88% of the aimed value of the torque split ratio. The reason is as follows: at the time of turning, half of a bias torque is added to the side gear on a low wheel speed side, and half of the bias torque is reduced from the side gear on a high wheel speed side. As such, in the four-wheel drive device 8, the torque split ratio changes according to the turning direction, so that an aimed torque split between the front and rear wheels cannot be obtained. Note that, in a case where the coupling 32 is provided between the right rear wheel 14R and the right side gear 30R of the rear differential 22, an influence of the bias torque also changes according to the turning direction. Accordingly, the torque split changes according to the turning direction, so that the aimed torque split between the front and rear wheels cannot be obtained.

In this respect, as illustrated in FIG. 2, the electronic control device 50 of the present embodiment functionally includes a torque correcting portion 62 that corrects (changes) the torque command value of the coupling 32 just by an influence of the bias torque according to the turning direction, and a turning direction determination portion 64 that determines a turning direction, so that an actual total rear wheel torque (Rr torque) becomes the same value as an aimed value of the total rear wheel torque (Rr torque) of the rear wheels 14 regardless of the turning direction, that is, the aimed torque split between the front and rear wheels is attained.

The turning direction determination portion 64 determines a turning direction (that is, a direction of the bias torque) of the vehicle based on the steering angle θ detected by the steering sensor and corresponding to a steering direction. Alternatively, the turning direction determination portion 64 determines a turning direction (that is, a direction of the bias torque) based on a difference between respective rotation speeds of the right and left rear wheels.

At the time of the four-wheel drive running, the torque correcting portion 62 corrects a torque command value calculated by the coupling torque FF control portion 56 according to the turning direction determined by the turning direction determination portion 64. As illustrated in FIG. 4, a value of an actual torque split with respect to a torque split based on a clutch torque (a command value) of the coupling 32 is found in advance by experiment or analytically for each turning direction. Accordingly, from the relationship in FIG. 4, a coefficient K that synchronizes the torque split based on the clutch torque (the command value) of the coupling 32 with the actual torque split is found for each turning direction, and by multiplying (K*Pff) a torque command value Pff calculated by the coupling torque FF control portion 56 by the coefficient K, the torque command value is corrected. When the magnitude of the clutch torque of the coupling 32 is controlled based on the torque command value thus corrected, the clutch torque is corrected according to the turning direction, so that the actual torque split attains its aimed value. In the present embodiment, as illustrated in FIG. 4, since the total rear wheel torque (Rr torque) increases at the time of clockwise turning, the coefficient K is set to a value smaller than 1.0. That is, in the clockwise turning, the clutch torque is corrected to a torque decreasing side. Further, since the total rear wheel torque (Rr torque) decreases at the time of counterclockwise turning, the coefficient K is set to a value larger than 1.0. That is, in the counterclockwise turning, the clutch torque is corrected to a torque increasing side.

Further, with respect to the yaw rate FB control portion 58, the torque correcting portion 62 changes respective gains G of a proportional term, a derivative term, and an integration term of a feedback formula to find a torque correction value, according to the turning direction. The gains G are also set so that a torque correction value (a command value) calculated by the feedback formula is actually output as an aimed value. Accordingly, it is possible to prevent followability of the yaw rate Y to the target yaw rate Y* from changing according to the turning direction in the feedback control. Note that, in the clockwise turning, the gains are changed to smaller values in comparison with gains obtained in a case where when the coupling 32 is provided on the propeller shaft, and in the counterclockwise turning, the gains are changed to larger values in comparison with the gains obtained in a case where when the coupling 32 is provided on the propeller shaft. When the gains G are changed according to the turning direction as such, a torque correction amount is calculated based on the gains G, and the torque correction amount for each deviation is changed according to the turning direction.

Note that the above description deals with an example in which a feedback gain is corrected. However, the correction may be made by multiplying, by a correction coefficient according to the turning direction, a correction amount by the feedback control, or a whole torque command value obtained by correcting, by the feedback control, a torque command value calculated by the coupling torque FF control portion 56.

Figure 5:
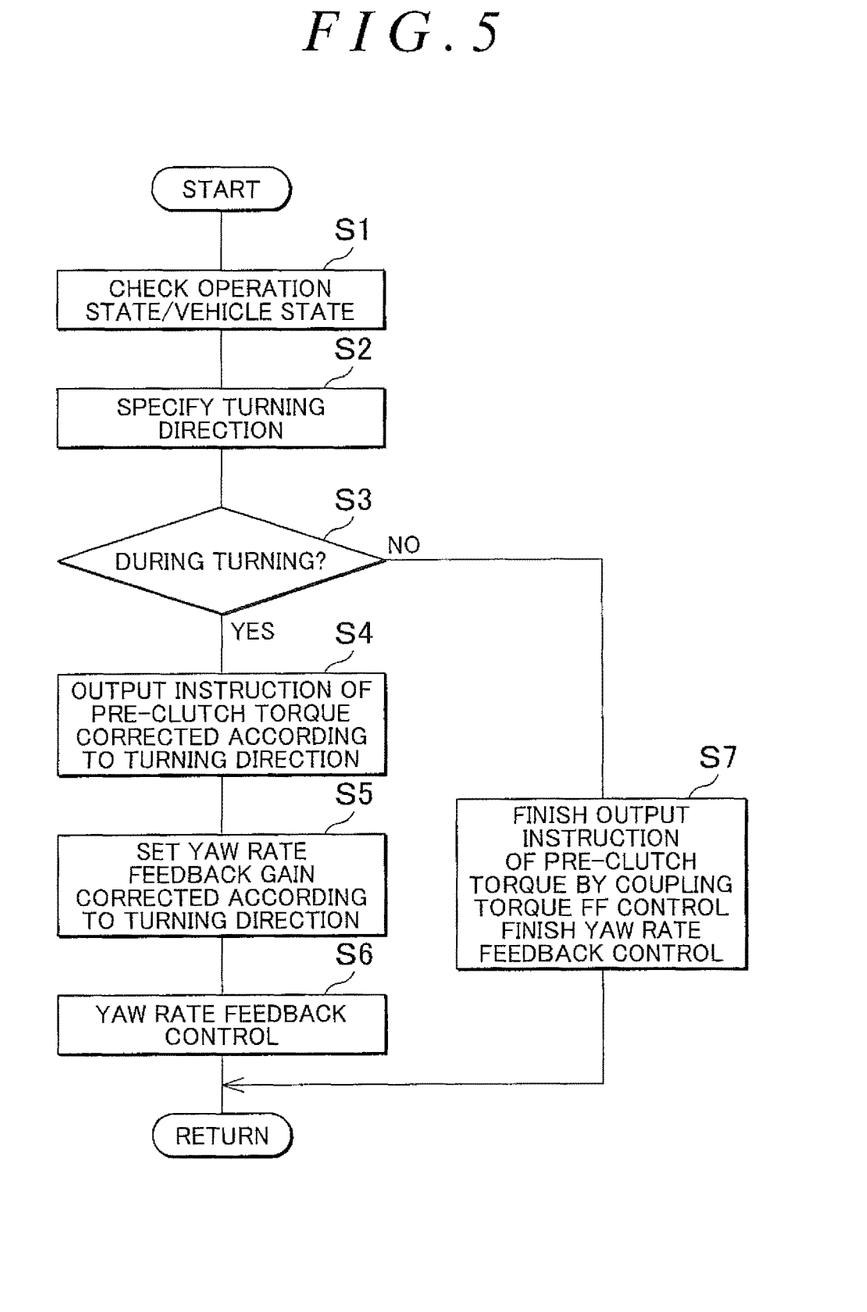
FIG. 5 is a flowchart to describe an essential part of a control operation of an electronic control device in FIG. 2, that is, a control operation to control a torque split between front and rear wheels to an aimed value regardless of a turning direction.

FIG. 5 is a flowchart to describe an essential part of a control operation of the electronic control device 50, that is, a control operation to control the torque split between the front and rear wheels to attain an aimed value regardless of the turning direction. This flowchart is performed repeatedly during running.

First, in step S1 (hereinafter "step" is omitted) corresponding to a function of the vehicle state detecting portion 52, a state of the vehicle is detected based on various rotation speeds, the steering angle θ, the accelerator opening degree Acc, and so on. In S2 corresponding to a function of the turning direction determination portion 64, a turning direction is determined based on the steering angle θ or right/left rear wheel speeds. In S3 corresponding to a function of the coupling torque FF control portion 56, it is determined whether or not the vehicle is turning based on whether the steering angle θ is the predetermined value α or more. In a case where the steering angle θ is less than the predetermined value α, when a pre-clutch torque is being output by the after-mentioned coupling torque FF control and the yaw rate feedback control is being performed in S7, the output and the control are finished. In the meantime, in a case where the steering angle θ is the predetermined value α or more, the process proceeds to S4. Herein, a threshold of the steering angle to start or finish the coupling torque FF control and the yaw rate feedback control is the same value α, but may be changed appropriately.

In S4 corresponding to functions of the coupling torque control portion 54, the coupling torque FF control portion 56, and the torque correcting portion 62, a torque command value Pff (pre-clutch torque) set based on the steering angle θ and the vehicle speed V is calculated, the torque command value Pff is then corrected according to the turning direction, and a current command value of the control solenoid 35 of the coupling 32 is controlled so that the torque command value thus corrected is output.

In S5 corresponding to functions of the yaw rate FB control portion 58 and the torque correcting portion 62, a feedback gain G according to the turning direction is set at the time of executing the yaw rate FB control. Subsequently, in S6 corresponding to functions of the coupling torque control portion 54 and the yaw rate FB control portion 58, the feedback control is executed based on the feedback gain G thus set in S5 and the deviation ΔY between the actual yaw rate Y and the target yaw rate Y*.

Figure 6:
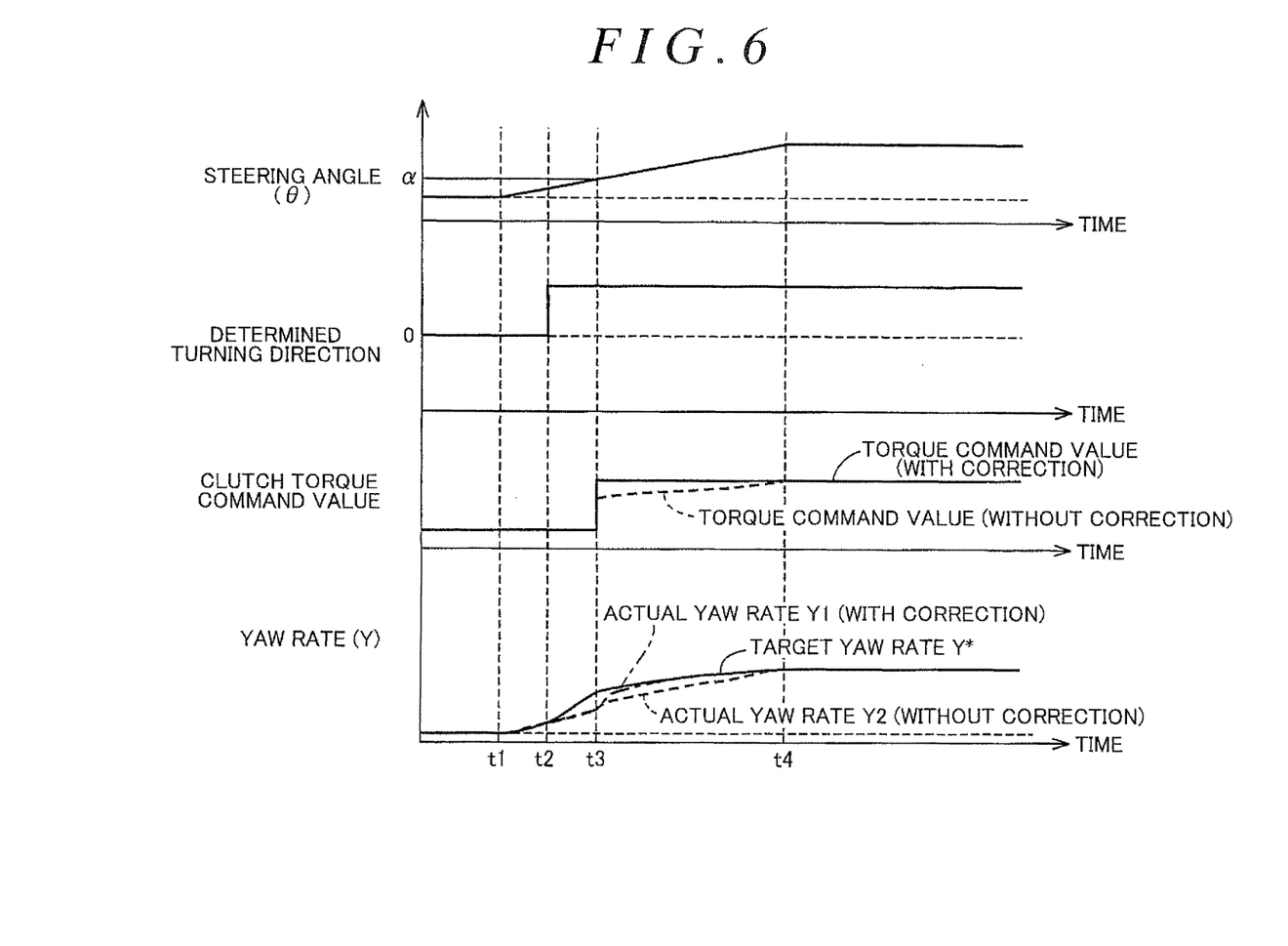
FIG. 6 is a time chart illustrating an operation result by the control operation of the electronic control device in FIG. 2, and illustrates a behavior in a case where counterclockwise turning is performed during four-wheel drive running.

FIG. 6 is a time chart illustrating an operation result by the control operation of the electronic control device 50. FIG. 6 illustrates a behavior in a case where counterclockwise turning is performed during four-wheel drive running. In the time chart of FIG. 6, a steering angle θ, a determined turning direction (a counterclockwise turning direction of the vehicle is regarded as a positive side), a clutch torque command value, and a yaw rate Y are illustrated sequentially from above. Note that a clutch torque command value indicated by a continuous line corresponds to an aspect (the present invention) in which the correction according to the turning direction is performed, and a torque command value indicated by a broken line indicates, as a comparison, an aspect in which the correction according to the turning direction is not performed. Further, a yaw rate indicated by a continuous line indicates the target yaw rate Y*, a yaw rate Y1 indicated by an alternate long and dash line indicates an aspect (the present invention) in which the correction according to the turning direction is performed, and a yaw rate Y2 indicated by a broken line indicates, as a comparison, an aspect in which the correction according to the turning direction is not performed.

When the counterclockwise turning is started at a time point t1 in FIG. 6, a direction (a turning direction) of a bias torque is determined at a time point t2. When the steering angle θ becomes the predetermined value α or more at a time point t3, a feedforward control (a pre-clutch torque output) based on the steering angle θ, a vehicle speed V, and the like is started. As illustrated in FIG. 6, in the counterclockwise turning, a corrected torque command value is a value higher than a value obtained in a case where the correction is not performed. The yaw rates Y1, Y2 indicated by the broken line (without correction) and the alternate long and short dash line (with correction) both approach the target yaw rate Y* after a time point t3. However, in a case where the correction is not performed, a difference between the target yaw rate Y* and the actual yaw rate Y2 is large.

The difference is reduced by a feedback control. However, in a case where the correction according to the turning direction is not performed, a gain of the feedback control is also small. Accordingly, the actual yaw rate Y2 indicated by the broken line and obtained in a case where the correction is not made does not readily converge to the target yaw rate Y* indicated by the continuous line. In the meantime, in a case where the correction according to the turning direction is made (the correction is made toward a torque increasing side), an actual torque split becomes the same as an aimed torque split. Accordingly, the actual yaw rate Y1 indicated by the alternate long and short dash line and obtained in a case where the correction is made immediately converges to the target yaw rate Y*. Thus, turning-round performance during turning improves in a case where the correction is made, as compared with a case where the correction is not made.

Figure 7:
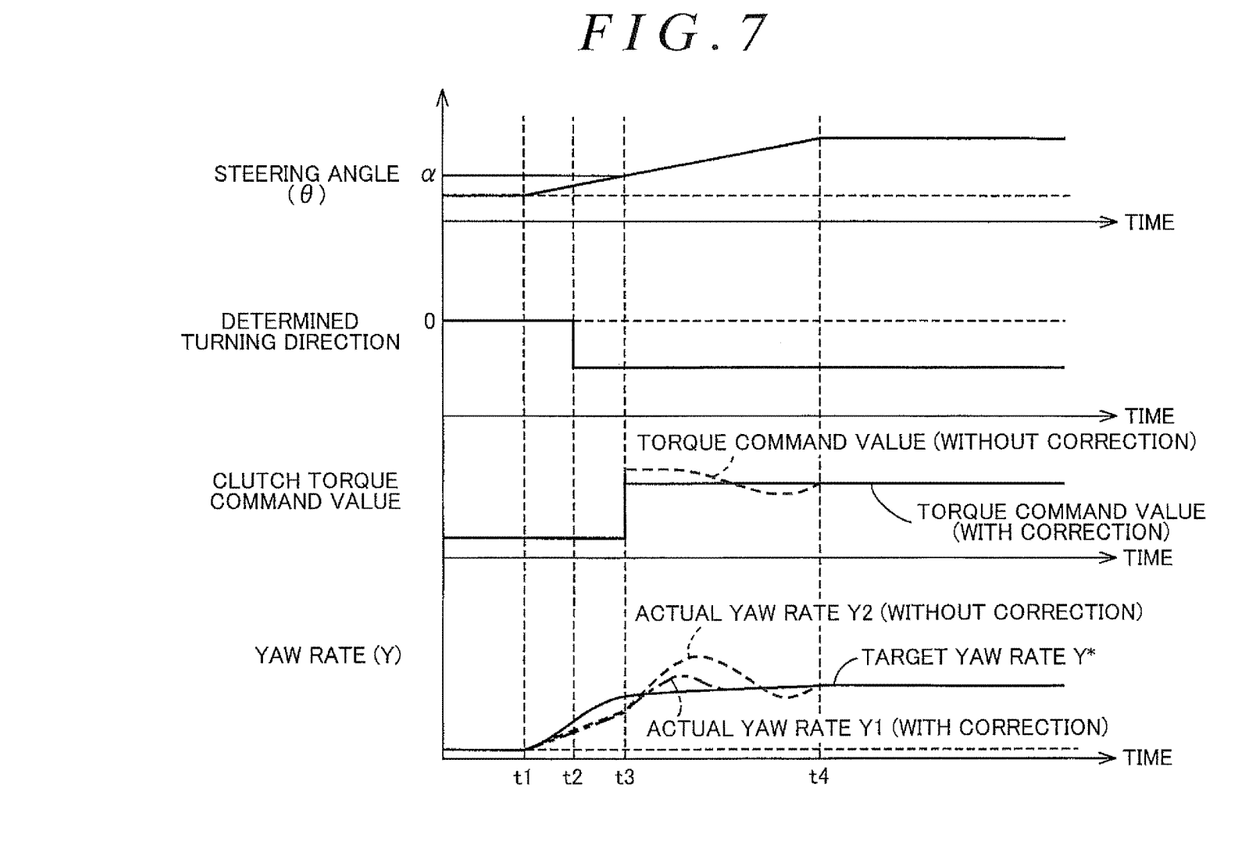
FIG. 7 is a time chart illustrating an operation result by the control operation of the electronic control device in FIG. 2, and illustrates a behavior in a case where clockwise turning is performed during four-wheel drive running.

FIG. 7 is a time chart illustrating an operation result by the control operation of the electronic control device 50, and illustrates a behavior in a case where clockwise turning is performed during four-wheel drive running.

When the clockwise turning is started at a time point t1 in FIG. 7, a direction (a turning direction) of a bias torque is determined at a time point t2. When the steering angle θ becomes the predetermined value α or more at a time point t3, a feedforward control based on the steering angle θ, the vehicle speed V, and the like is started. As illustrated in FIG. 7, in the clockwise turning, a corrected torque command value is a value lower than a value obtained in a case where the correction is not performed. Change slopes of yaw rates Y indicated by a broken line (without correction) and an alternate long and short dash line (with correction) become high after the time point t3.

Here, in a case where the correction is not performed, an actual torque split becomes larger than an aimed torque split. Along with this, an actual yaw rate Y2 indicated by a broken line largely exceeds a target yaw rate Y* indicated by a continuous line. At this time, even in a case where a deviation between the actual yaw rate Y and the target yaw rate Y* becomes large and a feedback control to cause the actual yaw rate Y to follow the target yaw rate Y* is performed, if the correction according to the turning direction is not performed, the actual yaw rate Y2 becomes oscillatory partly because a gain of the feedback control is large, which may take time before the actual yaw rate Y2 converges to the target yaw rate Y. In the meantime, in a case where the torque command value is corrected (toward a torque decreasing side) according to the turning direction as indicated by a continuous line, the actual torque split attains an aimed value. Accordingly, even in a case where the correction is performed, an actual yaw rate Y1 also exceeds the target yaw rate Y*, but the actual yaw rate Y is not largely separated from the target yaw rate Y* and immediately converges to the target yaw rate Y*. As such, turning-round performance during turning improves in a case where the correction is performed, as compared with a ease where the correction is not performed.

As described above, according to the present embodiment, at the time of four-wheel drive running, a turning direction of the vehicle is determined so as to determine an influence of a bias torque caused during turning of the vehicle with respect to the right and left rear wheels, and a magnitude of a clutch torque of the coupling 32 is corrected only by the influence of the bias torque based on the turning direction, thereby making it possible to prevent turning-round performance from changing according to the turning direction. For example, in a case where the four-wheel drive device 8 in which the coupling 32 is provided on a left-rear wheel side turns clockwise, a torque split toward the rear-wheel side increases with respect to an aimed torque split between the front and rear wheels at the time of the four-wheel drive running. In this regard, when the correction is made so as to decrease the clutch torque of the coupling 32, a torque to be transmitted to the rear-wheel side decreases, so that the aimed torque split can be obtained. Further, when the four-wheel drive device 8 turns counterclockwise, the torque split toward the rear-wheel side decreases with respect to the aimed torque split between the front and rear wheels at the time of the four-wheel drive running. In this regard, when the correction is performed so as to increase the clutch torque of the coupling 32, a torque to be transmitted to the rear-wheel side increases, so that the aimed torque split can be obtained.

Further, according to the present embodiment, the clutch torque of the coupling 32 during turning is increased as compared with a case where the vehicle does not turn, so the torque split toward the rear wheels increases during turning, thereby making it possible to increase the turning-round performance of the vehicle.

Further, according to the present embodiment, at the time when a feedback control by use of the deviation ΔY between the target yaw rate Y* and the actual yaw rate Y is performed, a gain G corresponding to a correction amount for each deviation or the correction amount itself is changed according to the turning direction. Accordingly, a controlled amount by the feedback control attains an aimed value, thereby making it possible to prevent followability to the target yaw rate from changing according to a turning direction.

Further, according to the present embodiment, the transfer 18 that distributes a torque of the engine 10 between the front wheels 12 and the rear wheels 14, and the propeller shaft 20 that connects the transfer 18 and the rear differential 22 in a power transmittable manner are provided. Further, the transfer 18 is provided with the connection/disconnection mechanism 28 that connects/disconnects the power transmission path between the engine and the propeller shaft 20. Since the connection/disconnection mechanism 28 is connected during four-wheel drive running, when the coupling 32 and the connection/disconnection mechanism 28 are released during two-wheel drive running, dragging is prevented in a rotational member that constitutes the power transmission path including the propeller shaft 20 and provided between the coupling 32 and the connection/disconnection mechanism 28. This makes it possible to further improve fuel efficiency.

Further, according to the present embodiment, a turning direction can be determined based on at least any of the steering angle θ and a difference between the rotational speeds of the right and left rear wheels 14.

The embodiment of the present invention has been described in detail with reference to the drawings, but the present invention is applied to the other aspects.

For example, in the above embodiment, the transfer 18 is provided with the connection/disconnection mechanism 28 that connects/disconnects power transmission to the rear-wheel side, but the connection/disconnection mechanism 28 may be omitted. Further, in the above embodiment, the coupling 32 is provided between the left rear wheel 14L and the left side gear 30L of the rear differential 22, but the present invention is also applicable to a case where the coupling 32 is provided between the right rear wheel 14R and the right side gear 30R of the rear differential 22. Note that, in a case where the coupling 32 is provided between the right rear wheel 14R and the right side gear 30R of the rear differential 22, when four-wheel drive running is performed, the clutch torque of the coupling 32 is corrected to decrease at the time of counterclockwise turning, and the clutch torque of the coupling 32 is corrected to increase at the time of clockwise turning. Further, with regard to a yaw rate FB control, in a case where the coupling 32 is provided on a right rear wheel side, the gain is decreased at the time of counterclockwise turning, and the gain is increased at the time of clockwise turning. That is, at the time of the four-wheel drive running, when the turning direction determination portion 64 determines that the turning direction is a direction in which the vehicle turns such that an outer wheel is a rear wheel 14 on a side where the coupling 32 is provided between the rear differential 22 and the rear wheel 14, the torque correcting portion 62 performs the correction to decrease a clutch torque of the coupling 32. The clutch torque of the coupling 32 is calculated by the feedforward control portion 56. Further, when the turning direction determination portion 64 determines that the turning direction is a direction in which the vehicle turns such that an inner wheel is a rear wheel on a side where the coupling 32 is provided, the torque correcting portion 62 performs the correction to increase a clutch torque of the coupling 32. The clutch torque of the coupling 32 is calculated by the feedforward control portion 56. With such a correction, a torque split attains an aimed value, thereby making it possible to prevent followability to the target yaw rate from changing according to the turning direction.

Further, in the above embodiment, the feedback control based on the deviation between the yaw rates is performed during turning, but the feedback control may be omitted. Further, in the above embodiment, the proportional term, the derivative term, and the integration term are used at the time when a torque correction value by the feedback control is calculated, but these three terms may not be necessarily required, and any of the proportional term, the derivative term, and the integration term may be omitted. Furthermore, the present invention is applicable even in a case where an increasing amount of the clutch torque of the coupling 32 by the coupling torque FF control during turning is zero, that is, in a case where the clutch torque is not particularly increased along with turning.

Further, in the above embodiment, the feedforward control (an output instruction of a pre-clutch torque) based on the steering angle θ and the vehicle speed V is executed, but the feedforward control may be based on only the steering angle θ.

Further, in the above embodiment, the front/rear torque split between the front and rear wheels and the target yaw rate Y* are found based on the relational map that is found and stored in advance, but how to find them is not necessarily limited to the relational map. The front/rear torque split between the front and rear wheels and the target yaw rate Y* may be found based on a relational expression found and stored in advance.

Note that the above descriptions are merely one embodiment to the utmost, and the present invention can be performed in an embodiment to which various changes and improvements are added based on the knowledge of a person skilled in the art.

What is claimed is:

1. A control device for a vehicle four-wheel drive device, the vehicle four-wheel drive device including a drive source, front wheels, rear wheels, a rear-wheel differential gear, and a friction clutch,
the front wheels being configured to receive a torque output from the drive source at a time of two-wheel drive running and at a time of the four-wheel drive running, the rear wheels being configured to receive the torque output from the drive source at the time of the four-wheel drive miming, the friction clutch being configured to adjust a torque split between the front and rear wheels at the time of the four-wheel drive running, the rear-wheel differential gear being configured to appropriately give a differential rotation to the rear wheels on right and left sides during turning,
the rear-wheel differential gear including a left side gear and a right side gear, the friction clutch being placed between either one of the left side gear and the right side gear and the rear wheel placed on a same side in a right-left direction, the other one of the left side gear and the right side gear being connected, without the friction clutch, to the rear wheel placed on the same side as the other one of the left side gear and the right side gear in the right-left direction, the control device comprising:
an electronic control unit configured to:
  detect a running state of a vehicle;
  calculate a magnitude of a clutch torque of the friction clutch according to the detected running state in a feedforward manner;
  set a target yaw rate from the detected running state of the vehicle;
  calculate a feedback correction amount to correct the magnitude of the clutch torque of the friction clutch according to a feedback gain and a deviation between the target yaw rate and the detected yaw rate in a feedback manner;
  control the magnitude of the clutch torque of the friction clutch based on the calculated magnitude of the clutch torque and the feedback correction amount so as to adjust the torque split between the front and rear wheels,
  determine a turning direction of the vehicle,
  correct the calculated clutch torque to decrease and set feedback gain to decrease based on the turning direction in a case where the four-wheel drive running is performed and it is determined that the turning direction is a direction in which the vehicle turns such that an outer wheel is a rear wheel on a side where the friction clutch is provided between the rear-wheel differential gear and the rear wheel; and
  correct the calculated clutch torque to increase and set the feedback gain to increase based on the turning direction in a case where the four-wheel drive running is performed and it is determined that the turning direction is a direction in which the vehicle turns such that an inner wheel is the rear wheel on the side where the friction clutch is provided between the rear-wheel differential gear and the rear wheel.

2. The control device for the vehicle four-wheel drive device, according to claim 1, wherein:
the vehicle four-wheel drive device includes a transfer and a propeller shaft;
the transfer is configured to distribute a torque of the drive source between the front wheels and the rear wheels;
the propeller shaft is configured to connect the transfer to the rear-wheel differential gear in a power transmittable manner;
the transfer includes a connection/disconnection mechanism;
the connection/disconnection mechanism is configured to connect/disconnect a power transmission path between the drive source and the propeller shaft; and
the connection/disconnection mechanism is configured to connect the power transmission path between the drive source and the propeller shaft during the four-wheel drive running.

3. The control device for the vehicle four-wheel drive device, according to claim 1, wherein:
the electronic control unit is configured to detect a steering direction; and
the electronic control unit is configured to determine the turning direction of the vehicle based on the steering direction.

4. The control device for the vehicle four-wheel drive device, according to claim 1, wherein:
the electronic control unit is configured to detect respective rotation speeds of the rear wheels on the right and left sides; and
the electronic control unit is configured to determine the turning direction of the vehicle based on a difference between the rotation speeds of the rear wheels on the right and left sides.

* * * * *